United States Patent [19]

Fylan

[11] Patent Number: 4,605,991

[45] Date of Patent: Aug. 12, 1986

[54] CONCEALED HEADLAMP

[75] Inventor: Michael S. Fylan, Lakeville, Mich.

[73] Assignee: General Motors Corporation, Detroit, Mich.

[21] Appl. No.: 715,616

[22] Filed: Mar. 25, 1985

Related U.S. Application Data

[63] Continuation-in-part of Ser. No. 552,410, Nov. 16, 1983, abandoned.

[51] Int. Cl.$^4$ ............................................. B60Q 11/00
[52] U.S. Cl. ...................................... 362/65; 362/64; 362/284; 362/428
[58] Field of Search .................... 362/61–71, 362/80–83, 277, 282, 284, 427, 428; 340/138–142; 116/45

[56] References Cited

U.S. PATENT DOCUMENTS

| | | | |
|---|---|---|---|
| 2,324,742 | 7/1943 | Voorhees et al. | 362/64 |
| 2,457,211 | 12/1948 | De Smet et al. | 362/64 |
| 3,387,125 | 6/1968 | Ingolia | 362/65 |
| 3,504,168 | 3/1970 | Johnson et al. | 362/64 |
| 4,310,872 | 1/1982 | Lauve | 362/82 |

Primary Examiner—Samuel Scott
Assistant Examiner—Noah Kamen
Attorney, Agent, or Firm—Charles E. Leahy

[57] ABSTRACT

A headlamp assembly is fixedly mounted below the trailing edge of an opening provided in a forwardly sloping vechicle body panel. The leading edge of the opening is spaced substantially forward of the headlamp and in general horizontal alignment with the lower edge of the headlamp so that the illumination from the headlamp shines forwardly through the opening and onto the roadway. A closure door is pivotally mounted on the vehicle body for rotary movement about a transverse axis and has a first closure surface sized and contoured to mate with the body panel and close the opening to thereby conceal the headlamp and streamline the vehicle body. When the closure door is rotated downwardly to expose the headlamp, the first closure surface is stored within the space between the headlamp and the leading edge of the opening. The closure door has a second closure surface which assumes a horizontal position and is sized and configured to define a floor which substantially fills the space between the headlamp and the leading edge of the opening.

3 Claims, 5 Drawing Figures

CONCEALED HEADLAMP

This is a continuation-in-part of Ser. No. 552,410 filed Nov. 16, 1983, now abandoned.

The invention relates to a motor vehicle headlamp concealed by a movable door.

BACKGROUND OF THE INVENTION

It is well known in motor vehicles to provide a headlamp assembly which is concealed from view when the headlamp is not illuminated. Concealment of the headlamp assembly provides a desirable appearance and also streamlines the airflow over the vehicle.

It is known to conceal the headlamp assembly by mounting the headlamp assembly for rotary movement from a raised position in which the headlamp shines forwardly of the vehicle to a concealed position in which the headlamp is rotated within an opening in the vehicle body. A cover panel is mounted on the headlamp assembly and is simultaneously rotated into a position closing the opening which was vacated by the headlamp. Examples of this, type of arrangement are U.S. Pat. No. 3,387,125, Ingolia issued June 4, 1968, and Great Britain Pat. No. 1,159,639, published July 30, 1969, in which the headlamp and cover rotate about an axis extending longitudinally of the vehicle. Other known arrangements of this type have the headlamp and cover rotating about an axis extending transversely of the vehicle.

It is also known to fixedly mount the headlamp in an opening in the vehicle body and to pivot a door between open and closed positions relative to the fixed headlamp. The prior art has recognized that storing such a pivoted door in a vehicle body requires the provision of a storage space for receiving the door. In U.S. Pat. No. 2,324,742, Voorhees et al issued July 20, 1943, the door is moved downwardly to a stored position below the fixed headlamp. In U.S. Pat. No. 2,524,442, Healey issued Oct. 3, 1950, the cover opens above the headlamp and only a portion of the door is received in a storage space so that a major portion of the door remains visible. U.S. Pat. No. 3,504,168, Johnson issued Mar. 31, 1970, provides upper and lower doors 22 and 24 which are pivoted for movement about separate transverse axes to store within the limited available space.

SUMMARY OF THE INVENTION

According to the invention, a headlamp assembly is fixedly mounted below the trailing edge of an opening provided in a forwardly sloping vehicle body panel. The leading edge of the opening is spaced substantially forward of the headlamp and in general horizontal alignment with the lower edge of the headlamp so that the illumination from the headlamp shines forwardly through the opening and onto the roadway. A closure door is pivotally mounted on the vehicle body for rotary movement about a transverse axis and has a first closure surface sized and contoured to mate with the body panel and close the opening to thereby conceal the headlamp and streamline the vehicle body. When the closure door is rotated downwardly to expose the headlamp, the first closure surface is stored within the space between the headlamp and the leading edge of the opening. The closure door has a second closure surface which assumes a horizontal position and is sized and configured to define a floor which substantially fills the space between the headlamp and the leading edge of the opening.

Accordingly, the object, feature and advantage of the invention resides in the provision of a closure door pivotally mounted in an opening in the forwardly sloping front panel of a vehicle body and having a first closure surface sized and contoured to conceal the headlamp and streamline the vehicle body, and a second closure surface which is sized and configured to define a floor substantially filling the space between the headlamp and the leading edge of the opening when the closure door is pivoted to the open position.

BRIEF DESCRIPTION OF THE DRAWINGS

These and other features and advantages of the invention will be apparent upon consideration of the specification and the appended drawings in which.

DESCRIPTION OF THE PREFERRED EMBODIMENT

Figure 1:
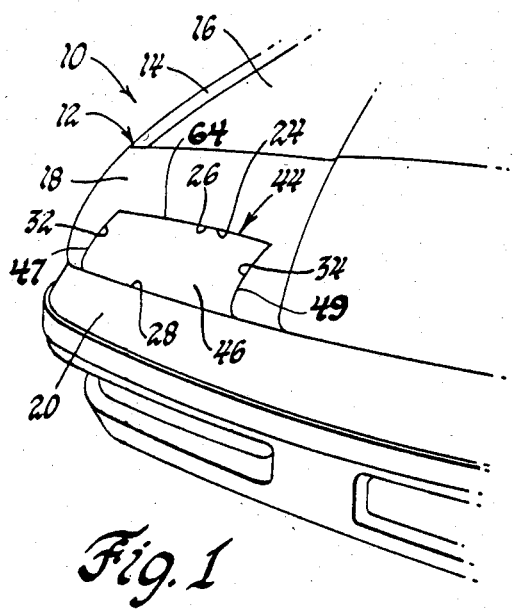
FIG. 1 is a partial perspective view of a front end of a motor vehicle body showing the closure door in the closed position concealing the headlamp and streamlining the vehicle body.

Referring to FIG. 1 of the drawing, there is shown a motor vehicle body 10 having a forwardly sloping vehicle body front end structure 12 which includes a right front quarter-panel 14, a hood 16, a header panel 18, and a bumper fascia 20. An opening 24 is provided in the forwardly sloping front end structure 12. The opening 24 includes a trailing edge 26 defined by the header panel 18 and a leading edge 28 defined by the bumper fascia 20. The side edges of the opening 24 are defined by side walls 32 and 34 which depend vertically from the header panel 18 and may be integral therewith or attached thereto.

Figure 2:
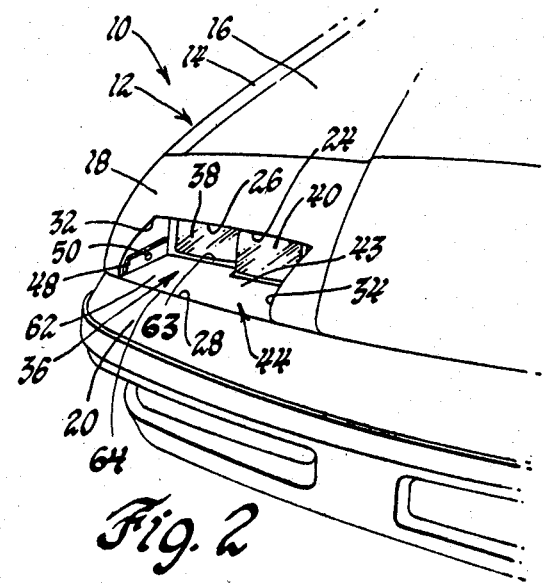
FIG. 2 is a perspective view similar to FIG. 1, but showing the closure door rotated to the open position in which a second closure surface of the closure door defines a floor filling the space forwardly of the headlamp.
Figure 3:
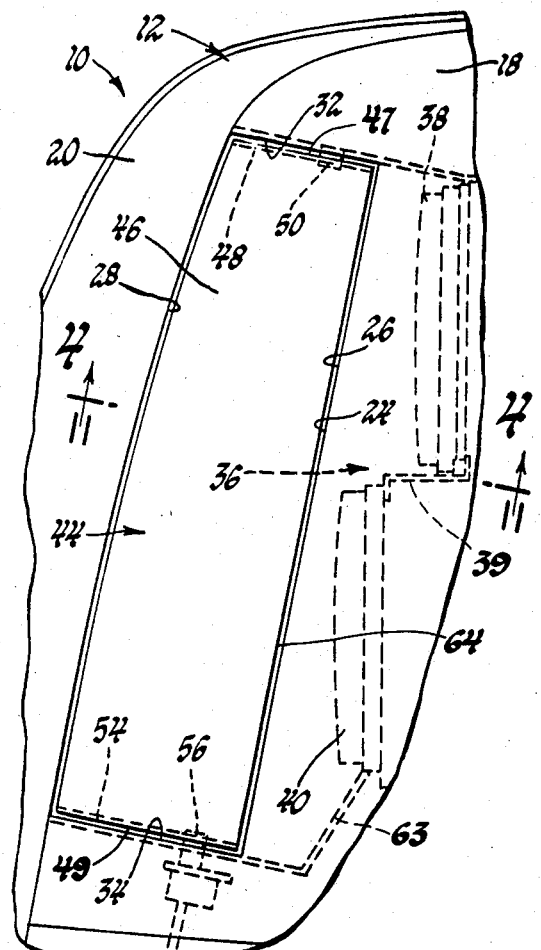
FIG. 3 is a plan view of the closure door in the closed position corresponding to FIG. 1.
Figure 4:
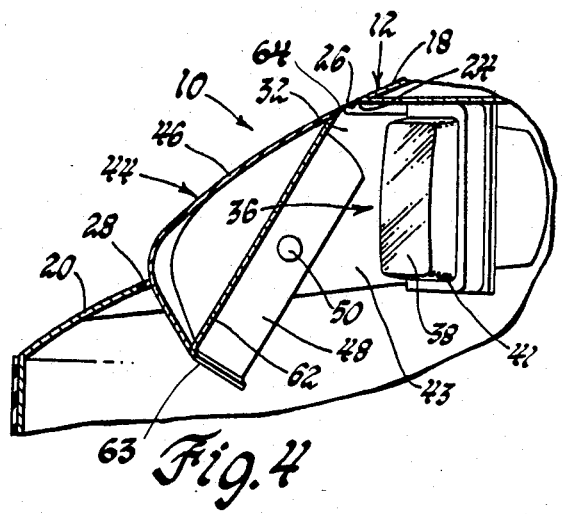
FIG. 4 is a sectional view taken in the direction of the arrows 4—4 of FIG. 3.
Figure 5:
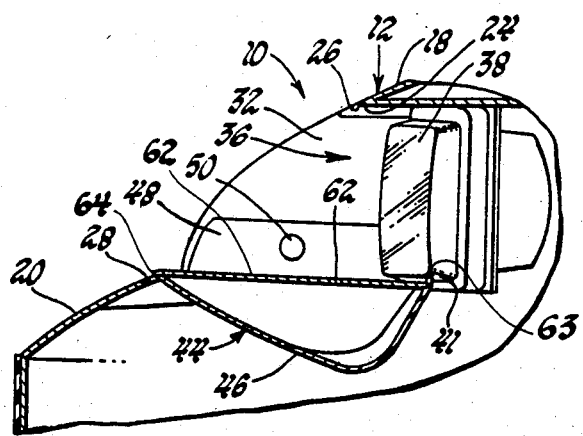
FIG. 5 is a view similar to FIG. 4, but showing the closure door in the open position corresponding to FIG. 2.

A headlamp assembly 36 is recessed within the opening 24 and includes a pair of headlamps 38 and 40. The headlamps 38 and 40 are mounted vertically on the vehicle body 10 below and just rearwardly of the trailing edge 26 of the opening 24 so that the headlamps 38 and 40 are recessed and define a rear wall of the opening 24, as best seen in FIGS. 2 and 5. As seen in FIG. 3, the headlamps are staggered with the headlamp 40 being situated forwardly of the headlamp 38. The side walls 32 and 34, or extensions thereof, extend inwardly to substantially fill and close the space around the headlamps 38 and 40. A filler panel 39 substantially fills and closes the space between the headlamps 38 and 40. The filler panel 41 and the extension portion of the side walls 32 and 34 which function to fill the space between and around the headlamps 38 and 40 may be conveniently provided by a bezel. The leading edge 28 of the opening 24 is in the same horizontal plane as the lower edge 41 of the headlamps 38 and 40 so that the illumination from the headlamps shines out of the opening 24 and onto the highway. Accordingly, as best seen in FIGS. 2 and 4, the headlamps 38 and 40 are mounted substantially rearwardly of the leading edge 28 so that there remains a substantial space 43 for receiving and storing a headlamp closure door 44, as will be discussed hereinafter. The leading edge of the space 43 is the same leading edge 28 of the opening 24 and is defined by the bumper fascia 20. The rear edge of the space 43 is defined by the staggered headlamps 38 and 40 and is accordingly shaped substantially different from and located further rearwardly than the trailing edge 26 of the opening 24 in the front end structure 12 as best seen in the plan view of FIG. 3.

The closure door 44 is provided for concealing the headlamps 38 and 40. As best seen in FIGS. 1, 3 and 4, the closure door 44 includes a first closure surface 46 which is sized to substantially fill and close the opening 24, leaving only a small gap which will allow the closure door 44 to move within the opening as discussed hereinafter. The first closure surface 46 is contoured to mate with the curvature of the forward sloping vehicle body front end structure 12 so as to both conceal the headlamps 38 and 40 and also streamline the vehicle body 10. The closure door 44 is pivotally mounted for rotary movement about an axis extending transversely of the vehicle body. The outboard end 47 of closure door 44 includes a skirt 48 which is pivotally connected to the side wall 32 of opening 24 by a pivot pin 50. A motor-operated drive cable 58 is connected to the closure door 44 through a pivot pin 56 connected to a skirt 54 at the inboard end 49 of the closure door 44 and is actuable to rotate the closure door 44 between the closed position of FIG. 4 and the open position of FIG. 5. When the drive cable 58 rotates the closure door 44 to the open position shown in FIG. 5, it is seen that the first closure surface 46 is rotated downwardly and forwardly in the counterclockwise direction as viewed in FIG. 4 so that the first closure surface passes through the space 43 between the headlamps 38 and 40 and the leading edge 28 of the opening 24 and reaches the stored position of FIG. 5.

The closure door 44 has a second closure surface 62 which is preferably planar in contour and assumes a generally horizontal position of FIGS. 2 and 5 when the closure door 44 is rotated to the open position. The second closure surface 62 is sized and contoured to substantially fill and close the space 43 between the bottom of the headlamps 38 and 40 and the leading edge 28 of the opening 24 and between the side walls 32 and 34, leaving only a small gap which will allow the closure door 44 to rotate back to the closed position. As best seen in FIGS. 2 and 3, the trailing edge 63 of the second closure surface is staggered to abut the lower edge 41 of the staggered headlamps 38 and 40 in substantially airflow sealing relationship therewith. The first closure surface 46 and the second closure surface 62 intersect at a mating edge 64 which alternately serves as a trailing edge to mate in substantial air sealing juxtaposition with the trailing edge 26 of the headlamp opening 24 in the door closed position of FIG. 1 or serves as a leading edge to mate in substantial air sealing juxtaposition with the the leading edge 28 of the headlamp opening 24 in the door open position of FIG. 2. Thus, it will be understood that the contour and curvature of the mating edge 64 is shaped to mate with either the trailing edge 26 or the leading edge 28 after rotating through 90-plus degrees of rotation.

As seen in FIGS. 2 and 5, the open position of the closure door 44 defines a forwardly opening air entrapping recess which streamlines airflow by capturing a stagnant column of air. The air entrapping recess is defined by the side walls 32 and 34, the headlamps 38 and 40 and the second closure surface 62 of the closure door 44. Thus, the concealed headlamp arrangement provides an improved air drag coefficient when the vehicle is driven with the closure door open or closed. Furthermore, as seen in FIG. 2, the headlamp arrangement has a pleasing appearance in the open position because the second closure surface 62 forms a floor which conceals the inside of the vehicle front end from view.

It will be understood that even though the closure door 44 is said to substantially close and fill the headlamp opening in the closed position and to substantially close and fill the space in front of the headlamps, a small air gap of perhaps 5 millimeters will remain around the door 44 in both the open and closed positions because the door 44 must be able to rotate without interfering with the adjacent edge of the opening. It may be desirable to mount a flexible sealing strip on either the moving closure door or the adjacent fixed edge to provide a more complete air gap seal.

Thus, it is seen that the invention provides a new and improved arrangement for concealed headlamps in which the headlamps are recessed within an opening in the forward sloping front end of the vehicle body and the opening is closed by a rotatably mounted closure panel having a first closure surface contoured to streamline the vehicle body when the closure door is closed, and a second closure surface which is deployed to a horizontal position to close out the space between the headlamp and the lower leading edge of the headlamp opening when the closure panel is rotated to the open position.

The embodiments of the invention in which an exclusive property or privilege is claimed are defined as follows:

1. In a vehicle body having a headlamp opening in a forwardly sloping vehicle body panel defined by a lower leading edge, a trailing upper edge and laterally spaced apart side edges, a headlamp assembly for illuminating a roadway and being fixedly mounted in the headlamp opening below the upper trailing edge and rearwardly above the leading edge so that the fixed headlamp defines a rear wall of the headlamp opening and a space between the fixed headlamp and the lower leading edge of the headlamp opening, the improvement comprising:

first and second vertical side walls depending respectively from the side edges of the opening to define side walls extending between the headlamp and the upper trailing edge and lower leading edge of the headlamp opening;

a closure door having a first closure surface sized to fill the headlamp opening and contoured to match the forward slope of the vehicle body panel to thereby conceal the fixed headlamp and streamline airflow over the vehicle body when the closure door is closed;

pivot means acting between the closure door and the vehicle body to enable rotary movement of the closure door about an axis transversely of the vehicle body to move the first closure surface downwardly through the space between the fixed headlamp and the lower leading edge of the headlamp opening to an open position stored within the space between the fixed headlamp and the lower leading edge of the headlamp opening to thereby open the headlamp opening and expose the fixed headlamp for illumination of the roadway; and said closure door having a second closure surface sized and configured differently from the first closure surface to define a horizontal floor substantially filling the space between the fixed headlamp and the lower leading edge of the headlamp opening and between the first and second side walls when the closure door is rotated about the transverse axis to the open position so that the headlamp, side walls and second closure surface cooperate to define a forwardly opening air entrapping recess which streamlines airflow by capturing a stagnant column of air.

2. In a vehicle body having a headlamp opening in a forwardly sloping vehicle body panel defined by a lower leading edge, a trailing upper edge and laterally spaced apart side edges, and a pair of headlamps for illuminating a roadway and being fixedly mounted at longitudinally staggered positions in the headlamp opening below the upper trailing edge and rearwardly above the lower leading edge so that the fixed staggered headlamps define a staggered rear wall of the headlamp opening and a space between the fixed staggered headlamps and the lower leading edge of the headlamp opening and shine over the lower leading edge of the headlamp opening and illuminate the roadway, the improvement comprising:

first and second vertical side walls depending respectively from the side edges of the opening to define side walls extending between the fixed staggered headlamps and the upper trailing edge and lower leading edge of the headlamp opening;

a closure door having a first closure surface and a second closure surface, said first closure surface being sized to fill the headlamp opening and contoured to match the forward slope of the vehicle body panel to thereby conceal the fixed staggered headlamps and streamline airflow over the vehicle body and said second closure surface being generally planar and sized and configured differently from the first closure surface to define a horizontal floor adapted to substantially fill the space between the fixed staggered headlamps and the lower leading edge of the headlamp opening and between the first and second side walls; and pivot means acting between the closure door and the vehicle body to normally establish the closure door in a closed position in which the closure door fills the headlamp opening and matches the contour of the vehcile body and enables rotary movement of the closure door about an axis transversely of the vehicle body to move the first closure surface forwardly and downwardly through the space between the fixed staggered headlamps and the lower leading edge of the headlamp opening to an open position stored within the space between the fixed headlamp assemblies and the lower leading edge of the headlamp opening to thereby open the headlamp opening and expose the fixed staggered headlamps for illumination of the roadway and concomitantly establish the second closure surface in a closed position acting to fill the space between the fixed staggered headlamps and the lower leading edge of the headlamps opening and between the first and second side walls so that the headlamp, the side walls and the second closure surface cooperate to define a forwardly opening air entrapping recess which streamlines airflow by capturing a stagnant column of air.

3. In a vehicle body having a headlamp opening in a forwardly sloping vehicle body panel defined by a lower leading edge, a trailing upper edge and laterally spaced apart side edges, and a headlamp assembly for illuminating a roadway and fixedly mounted in the headlamp opening below the upper trailing edge and above the leading edge so that the fixed headlamp defines a rear wall of the headlamp opening and a space between the fixed headlamp and the lower leading edge of the headlamp opening, the improvement comprising:

first and second vertical side walls depending respectively at the side edges of the opening to define side walls extending between the headlamp and the upper trailing edge and lower trailing edge of the headlamp opening;

a closure door having a first closure surface and a second closure surface contoured and sized differently from one another and having a common mating edge which is sized and configured to alternately mate with either the upper trailing edge or the lower leading edge of the headlamp opening in substantial air sealing juxtaposed relationship therewith, said first closure surface being sized to fill the headlamp opening and contoured to match the forward slope of the vehicle body panel to thereby conceal the headlamp and strealine airflow over the vehicle body when the common mating edge of the closure door is juxtaposed in air sealing relationship with the upper trailing edge of the headlamp opening and said second closure surface being generally planar and sized to define a floor adapted to substantially fill the space between the headlamp and the lower leading edge of the headlamp opening when the common mating edge is juxtaposed in sealing relationship with the lower leading edge of the headlamp opening; and pivot means acting between the closure door and the vehicle body to enable rotary movement of the closure door about an axis transversely of the vehicle body between a closed position in which the first closure surface closes the headlamp opening to streamline airflow of the vehicle body and an open position opening the headlamp opening and exposing the fixed headlamp for illumination of the roadway while simultaneously establishing the second closure surface in a position filling the space between the fixed headlamp and the lower leading edge of the headlamp opening and between the first and second side walls so that the headlamp, the side walls and the second closure surface cooperate to define a forwardly opening air entrapping recess which streamlines airflow by capturing a stagnant column of air.

* * * * *